Aug. 22, 1961  E. POPE  2,996,752
CASTER GUARD
Filed March 1, 1957
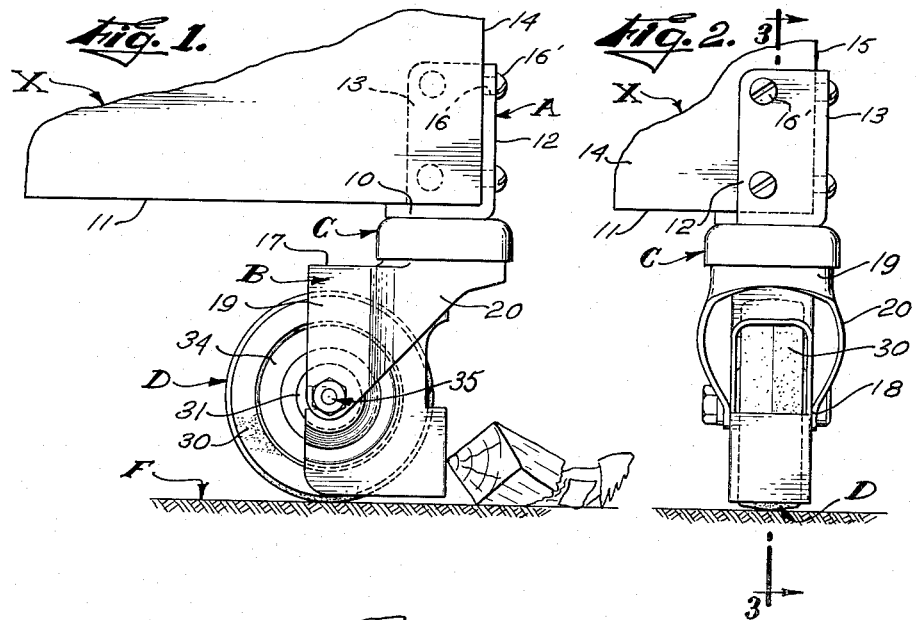
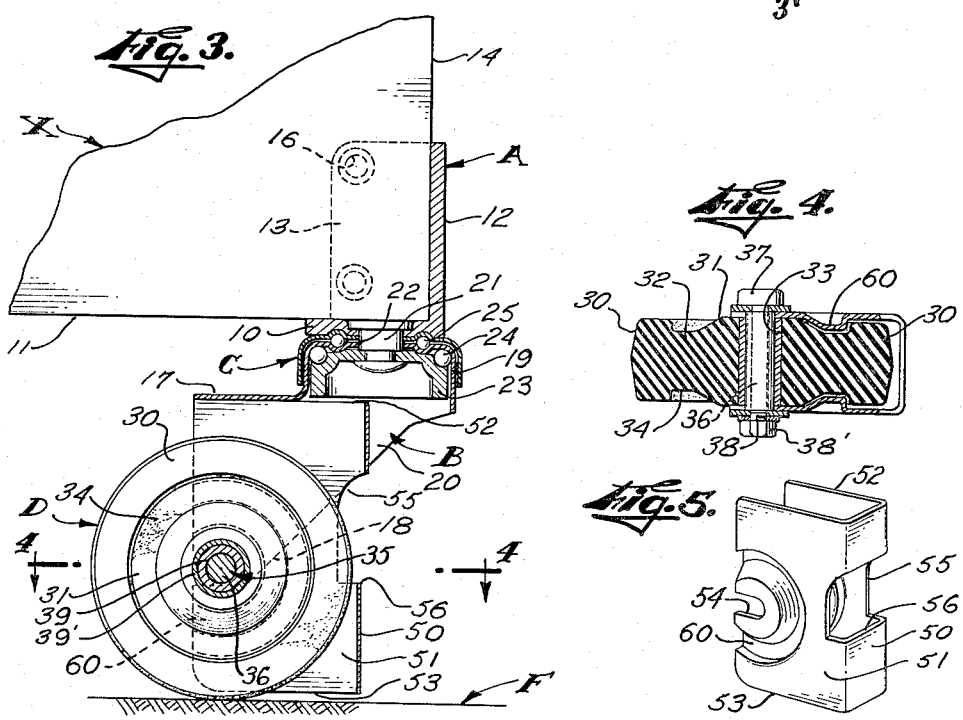
INVENTOR.
EDKER POPE
BY
George A. Maxwell
AGENT United States Patent Office 2,996,752
Patented Aug. 22, 1961

2,996,752
CASTER GUARD
Edker Pope, Pasadena, Calif.
(1529 E. 7th St., Los Angeles, Calif.)
Filed Mar. 1, 1957, Ser. No. 643,401
8 Claims. (Cl. 16—18)

This invention has to do with a caster guard and is more particularly concerned with an attachment applicable to a conventional caster construction which serves to clear the path of the caster.

Caster supported carts, bins, trays and other similar pieces of work supporting and carrying apparatus have become widely used in industry. In many industries where movable or mobile caster supported apparatus is used, the floors or surfaces over which the apparatus move are cluttered with scrap material or litter. In some circumstances the scrap material is such that the caster wheel can roll over it, but with resulting bumping and jarring of the apparatus. In other circumstances, the scrap material or litter is such that it frequently becomes lodged in front of the caster wheels and stops the forward progress of the apparatus or trips and upsets the apparatus. In still another set of circumstances, the litter is such that it becomes stuck to the caster wheels or becomes engaged and lodged around the axles of the caster constructions and thereby interferes with or interrupts the action of the casters.

An object of the present invention is to provide an attachment applicable to a conventional caster construction to occur in front of the caster wheel and which serves to engage and displace litter which occurs in the path of the wheel.

Another object of the present invention is to provide an attachment of the character referred to having means adapted to engage and displace material which has become stuck to the caster wheel.

A further object of my invention is to provide a caster guard attachment having means related to each side of the caster wheel and adapted to prevent pieces of string and other similar bits of litter from becoming engaged around the axle of the caster construction.

An object of this invention is to provide a caster guard attachment of the character referred to which involves no moving parts and which can be advantageously formed of sheet material.

Another object of this invention is to provide an attachment of the character referred to which is both easy and economical of manufacture and which requires little or no skill to apply it to or remove it from a standard caster construction.

The various objects and features of my invention will be fully understood from the following detailed description of a typical preferred form and application of my invention, throughout which description reference is made to the accompanying drawings, in which:

FIG. 1 is a side elevational view of a typical or conventional caster construction and showing the guard attachment provided by the present invention related thereto.

FIG. 2 is a front elevational view of the construction shown in FIG. 1.

FIG. 3 is an enlarged detailed sectional view taken as indicated by line 3—3 on FIG. 2.

FIG. 4 is an enlarged detailed sectional view taken as indicated by line 4—4 on FIG. 3.

FIG. 5 is a perspective view of the attachment provided by the present invention and showing it apart from the caster construction.

The caster in the particular case illustrated is of conventional form and construction and includes generally, a mounting bracket A, a body B, means C rotatably connecting the body to the bracket, and a supporting wheel D engaged with and carried by the body.

The mounting bracket A is a unitary sheet metal member adapted to be engaged at a lower or bottom corner of a piece of apparatus X and is characterized by a flat bottom 10 adapted to engage the bottom 11 of the apparatus X and upwardly projecting side walls 12 and 13 arranged at right angles to each other and having their adjacent vertical side edges integrally joined to each other. The side walls 12 and 13 of the bracket A are adapted to engage the sides 14 and 15 of the apparatus and to extend around and embrace the corner established thereby.

In the case illustrated, the side walls 12 and 13 of the bracket A are provided with vertically spaced apertures 16 adapted to receive suitable screw fasteners 16', which fasteners engage in the apparatus X and secure the caster construction in fixed position thereon.

The body B of the caster construction is a unitary sheet metal member having an elongate flat, horizontally disposed top 17 with parallel front and rear ends and straight parallel side edges, a pair of like legs 18 depending from the side edges of the top, and an inverted cup-shaped mounting head 19 adjacent the front end of the top 17 of the body and projecting upwardly from the plane of said top of the body.

In the case illustrated, the body B is provided with suitable gussets 20 integrally joined to and extending between the forward edges of the legs 18 and the underside of the mounting head 19 which occurs forward of the top 17 of the body.

The means C of the caster construction, which means is adapted to rotatably connect the body B to the bracket A, includes generally, a pivot pin 21 fixed to and depending from the bracket, a central opening 22 in the mounting head 19 of the body and freely receiving the pivot pin, a round or substantially disc-shaped retainer 23 fixed to the lower terminal end of the pivot pin to occur within the cup-shaped head 19, suitable bearing means 24 and 25 between the retainer and the mounting head 19 and between the bottom 10 of the bracket and the mounting head 19.

The supporting wheel D of the caster construction illustrated is a conventional molded rubber or plastic caster wheel having an outer tread portion 30 adapted to engage the ground or the floor F, a central hub portion 31, and an intermediate portion 32. The central hub portion 31 is provided with a central axle receiving opening 33 and is slightly wider than the tread portion 30 of the wheel to insure working or running clearance between the tread portion of the wheel and the legs 18 of the body B when the wheel is engaged between the legs of the body and the caster construction is assembled. The intermediate portion 32 is considerably thinner than both the hub and the tread portions 31 and 32 in order to reduce the weight of the wheel and to reduce the quantity of material required to establish the wheel. The intermediate portion 32 of the wheel being thinner than the other portions of the wheel, establishes an annular recess 34 in each side of the wheel, as clearly illustrated in FIG. 4 of the drawings.

The wheel D is rotatably supported by an axle member 35 carried by the lower terminal ends of the legs 18 and extending through the central opening 33 in the central hub portion 31 of the wheel D. The axle member 35 is a simple bolt-like member having an elongate cylindrical shank 36, a head 37 at one end of the shank and a threaded portion 38 at the other end of the shank and projecting axially therefrom. The axle member 35 is engaged in or through a pair of axially aligned openings provided in the lower end portions of the legs 18 of the body B so that the head 37 engages the outer surface of one of the legs 18 of the body B and so that the threaded end portion 38 of the shank projects from the outer face of the other leg 18 of the body. A suitable nut 38' is threadedly engaged on the end portion 38 of the shank and engages the outer face of the said other leg 18 of the body B.

The opening 33 in the wheel D is substantially greater in diameter than the shank of the axle member 35. A tubular spacer sleeve 39 of predetermined longitudinal extent is slidably engaged around the shank 36 to occur between the legs 18 of the body B and to engage the inner opposed faces of the legs and hold them in fixed spaced relationship to each other. The sleeve 39 is of slightly greater longitudinal extent than the width of the hub portion 31 of the wheel D so that the legs 18 of the body A cannot be drawn into engagement with the wheel D and thereby interfere with the free operation of the wheel.

A suitable bearing sleeve 39' is provided in the opening 33 in the wheel D, which sleeve is fixed in the wheel and establishes sliding bearing engagement on and around the spacer sleeve 39.

It is to be understood that the caster construction set forth above is only typical of one such construction with which the guard that I provide can be advantageously related and that in practice, the various details of construction illustrated and described above can be varied widely as circumstances require.

The caster guard that I provide is a simple, elongate, vertically disposed, U-shaped member having a flat, vertically disposed front wall 50, flat, vertically disposed side walls 51 projecting rearwardly from the vertical side edges of the front wall, and flat, horizontally disposed top and bottom ends 52 and 53.

The side walls 51 are provided with rearwardly opening elongate slot-like openings 54 adapted to slidably engage the shank 36 of the axle member 35.

The front wall 50 is slightly wider than the tread portion 30 of the wheel D and is provided with an aperture 55 having a straight, horizontally disposed bottom edge 56 adapted to occur adjacent or in close proximity to the tread of the wheel D and to engage and remove, or knock off, material stuck to the wheel. The aperture 55 is of substantial vertical extent and establishes an opening which is large enough to freely pass the material stuck to the wheel D as it is rotated and advanced towards the said bottom edge 56.

The vertical extent of the guard is slightly less than the distance between the underside of the top 17 of the body B and the ground or floor F and is slightly greater in longitudinal extent than the diameter of the wheel D. The guard is adapted to be related to the caster so that the front wall 50 thereof occurs in front of the wheel D and so that the side walls 51 occur at the opposite sides of the wheel and between the legs 18 of the body B.

The slot-like openings 54 in the side walls 51 are positioned vertically so that when the guard is engaged on the axle member 35 the upper or top end 52 of the guard engages and seats against the underside of the top 17 of the body B and so that the bottom end 53 of the guard is clear of the floor F. With this relationship of parts, it will be apparent that when the front wall 50 or the forward portion of the guard engages or strikes an object in the path of the wheel D, the top 17 of the body B and upper end 52 of the guard cooperate to prevent rotation of the guard about the axle member 35 and in such a manner as would rotate the guard about the axle and shift the lower end 53 of the guard into engagement with the floor.

In the case illustrated, the side walls of the body adjacent the openings 54 occur between the ends of the spacer sleeve 39 and the legs 18 of the body so that when the nut 38' on the threaded end portion 38 of the axle member is advanced and drawn tight, the guard is held in tight clamped engagement with the caster construction and is clear of the wheel D.

It will be further apparent that by shifting the guard forwardly and rearwardly on the axle member 35, the proximity of the lower cleaning edge 56 of the openings 55 in the guard to the wheel D can be varied as circumstances require.

In the preferred carrying out of the invention and to prevent bits of string and the like from becoming wound or engaged around the axle member 35 at the opposite sides of the wheel D, I provide annular, inwardly projecting ribs 60 formed in the side walls 51 of the guard around the slots 55. The ribs 60 project into the recess 34 in the sides of the wheels D. With this relationship of parts, it will be apparent that string or other similar bits of material that cling to and are carried by the sides of the wheel D engage the inwardly projecting ribs 60 as the wheel is advanced and are displaced thereby.

When the ribs 60 are shaped to substantially completely occupy the recesses 34 in the wheel, in the manner set forth in FIG. 4 of the drawings, to prevent the guard from being shifted forwardly and rearwardly in the manner set forth above and in order to adjust the positioning of the cleaning edge 56 to the wheel. However, in practice, a compromise may be made wherein the ribs 60 are of limited extent and so that sufficient working clearance is provided between the ribs and the walls of the recesses to allow for limited shifting and adjustment of the guard.

From the foregoing, it will be apparent that the caster guard provided by the present invention is a convenient practical structure which requires little time and/or skill to apply it to a conventional caster construction, and which is both highly effective and dependable in operation.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A guard applicable to a caster construction having a body with depending legs, an axle member extending between the lower ends of the legs and a wheel engaged between the legs and rotatably carried by the axle member, including, a unitary U-shaped member having a vertically disposed front wall adapted to occur adjacent the forward tread portion of the caster wheel, and vertically disposed rearwardly projecting side walls adapted to occur between opposite sides of the caster wheel and the adjacent legs and having rearwardly opening notches adapted to slidably receive the axle member, the front wall having an opening with a horizontally disposed bottom edge extending transverse the front wall at a point between the upper and lower ends of the guard and to occur adjacent the forwardmost tread portion of the wheel to engage and displace litter stuck to the caster wheel.

2. A guard applicable to a caster construction having a body with depending legs, an axle member extending between the lower ends of the legs and a wheel having annular grooves in its sides and engaged between the legs and rotatably carried by the axle member, including, a unitary U-shaped member having a vertically disposed front wall adapted to occur adjacent the forward tread portion of the caster wheel, and vertically disposed rearwardly projecting side walls adapted to occur between the opposite sides of the caster wheel and the adjacent legs and having rearwardly opening notches adapted to slidably receive the axle member, the side walls of the guard having semi-annular ribs projecting laterally into the grooves in the sides of the wheel and adapted to displace litter stuck to the sides of the wheel.

3. A guard applicable to a caster construction having a substantially U-shaped body with rearwardly inclined depending legs, an axle member extending between and carried by the lower ends of the legs and a wheel having annular grooves in its sides and engaged between the legs and rotatably carried by the axle member, including, a unitary U-shaped member having a vertically disposed front wall adjacent the forward tread portion of the caster wheel, and vertically disposed rearwardly projecting side walls between the opposite sides of the caster wheel and the adjacent legs and having rearwardly opening notches slidably receiving the axle member, the side walls of the guard having semi-annular ribs projecting laterally into the grooves in the sides of the wheel to displace litter from the grooves, the front wall having an opening extending between the side walls and defining a horizontally disposed bottom edge occurring between the upper and lower ends of the front wall and occurring adjacent the forwardmost tread portion of the wheel to engage and displace litter stuck to the wheel.

4. A guard applicable to a caster construction having a substantially U-shaped body with front and rear ends, a flat, horizontally disposed top and substantially vertically disposed depending legs at opposite sides of the top and a wheel engaged between and rotatably carried by the legs including, a unitary member having a vertically disposed front wall to occur adjacent the forward tread portion of the caster wheel, and rearwardly projecting vertically disposed side walls occurring at opposite sides of the wheel and supported by the legs of the caster body, the side walls having horizontally disposed upper edges engaging and seated against the under side of the top of the caster body.

5. A guard applicable to a caster construction having a substantially U-shaped body with a flat horizontally disposed top and substantially vertically disposed depending legs, an axle member secured to and extending between the lower ends of the legs and a wheel engaged between the legs and rotatably carried by the axle member including, a unitary U-shaped member having a vertically disposed front wall to occur adjacent the forward tread portion of the caster wheel, and rearwardly projecting side walls adapted to occur between the opposite sides of the wheel and the adjacent legs of the caster body and supported by the axle member, the side walls having horizontally disposed upper edges engaging and seated against the underside of the horizontally disposed top of the caster body and serving to prevent relative rotation between the guard and the body.

6. A guard applicable to a caster construction having a substantially U-shaped body with front and rear ends, a flat, horizontally disposed top and vertically disposed depending legs, an axle member fixed to and extending between the lower ends of the legs and a wheel engaged between the legs and rotatably carried by the axle member including, a unitary U-shaped member having a vertically disposed front wall to occur adjacent the forward tread portion of the caster wheel, and rearwardly projecting vertically disposed side walls projecting between the opposite sides of the wheel and the adjacent legs and supported by the axle member, the side walls having horizontally disposed upper edges engaging and seated against the underside of the top of the caster body, the front wall having an opening occurring between its upper and lower ends and extending between the side walls, said opening having a horizontally disposed bottom edge occurring adjacent the forwardmost portion of the tread portion of the caster wheel to engage and displace litter stuck to the caster wheel.

7. A guard applicable to a caster construction having a mounting bracket, a substantially U-shaped body with a flat horizontally disposed top rotatably carried by the bracket on a vertical axis and depending legs at opposite sides of the top, a horizontally disposed axle member fixed to and extending between the lower ends of the legs and rearwardly offset from the vertical pivotal axis of the body and a wheel having annular grooves in its sides and engaged between the legs and rotatably carried by the axle member including, a unitary U-shaped member having a vertically disposed front wall adapted to occur adjacent the forward tread portion of the caster wheel, and vertically disposed rearwardly projecting side walls to occur between the opposite sides of the wheel and the adjacent legs and having rearwardly opening notches slidably receiving the axle member, the side walls having horizontally disposed upper edges engaging and seated against the under side of the horizontally disposed top of the caster body, the side walls of the guard having semi-annular ribs projecting laterally into the groove in the sides of the wheel to engage and displace litter stuck to the sides of the wheel.

8. A guard applicable to a caster construction having a mounting bracket, a substantially U-shaped body with a flat horizontally disposed top and depending legs at opposite sides of the top, a horizontally disposed axle member extending between the lower ends of the legs and rearwardly offset from the vertical pivotal axis of the body, and a wheel having annular grooves in its sides and a peripheral tread portion and engaged between the legs and rotatably carried by the axle member including, a unitary U-shaped sheet metal member having a vertically disposed front wall to occur adjacent the forward tread portion of the caster wheel, and vertically disposed rearwardly projecting side walls to occur between the opposite sides of the wheel and the adjacent legs and having rearwardly openings notches to slidably receive the axle member, the side walls having horizontally disposed upper edges engaging and seated against the underside of the horizontally disposed top of the caster body, the side walls of the guard having semi-annular ribs projecting laterally into the groove in the sides of the wheel to engage and displace litter stuck to the sides of the wheel, the front wall having an opening intermediate its upper and lower ends and extending between the side walls, said opening defining an upwardly disposed horizontal edge at its lower end to extend transverse and occur adjacent the forwardmost portion of the tread portion of the wheel to engage and displace litter stuck to the caster wheel.

References Cited in the file of this patent

UNITED STATES PATENTS

| | | |
|---|---|---|
| 288,918 | Botsford | Nov. 20, 1883 |
| 1,092,506 | Oldroyd | Apr. 7, 1914 |
| 1,432,966 | Chesnutt | Oct. 24, 1922 |
| 1,563,152 | Bowen | Nov. 24, 1925 |
| 1,848,310 | Brown | Mar. 8, 1932 |
| 1,900,672 | Uhl | Mar. 7, 1933 |
| 2,018,530 | Pawsat | Oct. 22, 1935 |
| 2,129,579 | Herold | Sept. 6, 1938 |
| 2,130,245 | Noelting | Sept. 13, 1938 |
| 2,450,062 | Voss et al. | Sept. 28, 1948 |
| 2,483,241 | Shepherd | Sept. 27, 1949 |